(12) United States Patent
Kamery et al.

(10) Patent No.: US 8,776,430 B1
(45) Date of Patent: *Jul. 15, 2014

(54) REMOTE-CONTROLLED CAGE TRAP DOOR-OPENING MECHANISM

(75) Inventors: Christopher Kamery, Lancaster, PA (US); Marko Lubic, Shillington, PA (US); Christopher T. Rich, Leola, PA (US)

(73) Assignee: Woodstream Corporation, Lititz, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/610,400

(22) Filed: Sep. 11, 2012

Related U.S. Application Data

(63) Continuation of application No. 12/585,803, filed on Sep. 24, 2009, now Pat. No. 8,359,783.

(60) Provisional application No. 61/136,676, filed on Sep. 24, 2008.

(51) Int. Cl.
    *A01M 23/00* (2006.01)
    *A01M 23/16* (2006.01)
    *A01M 23/18* (2006.01)
    *A01M 23/20* (2006.01)

(52) U.S. Cl.
    USPC ........................................ 43/61; 43/58; 43/60

(58) Field of Classification Search
    USPC ............ 43/58, 60, 61; 49/197–198, 324, 332, 49/334, 336, 15, 17, 18; 296/61, 35.3
    See application file for complete search history.

(56) References Cited

U.S. PATENT DOCUMENTS

| | | | | |
|---|---|---|---|---|
| 1,380,229 A | * | 5/1921 | Manheim | 49/324 |
| 2,709,583 A | * | 5/1955 | Gdovichin et al. | 49/324 |
| 3,319,696 A | * | 5/1967 | Wiegand | 49/199 |
| 3,452,964 A | * | 7/1969 | Bibeault | 49/324 |
| 3,638,346 A | * | 2/1972 | Stein | 43/65 |
| 3,695,332 A | * | 10/1972 | Bahnsen | 49/199 |
| 3,911,609 A | * | 10/1975 | Baya | 43/26.1 |
| 4,018,259 A | * | 4/1977 | Herms | 160/26 |

(Continued)

FOREIGN PATENT DOCUMENTS

| | | |
|---|---|---|
| AU | 2005 100173 | 4/2005 |
| CN | 200969813 | 11/2007 |
| DE | 199 54 142 | 5/2001 |
| SU | 454881 | 4/1975 |

OTHER PUBLICATIONS

Woodstream, "5 Steps to Catch and Release," www.havahart.com (Brochure).

(Continued)

*Primary Examiner* — Darren W Ark
(74) *Attorney, Agent, or Firm* — Jacobson Holman, PLLC

(57) ABSTRACT

A remotely activated door-opening mechanism is provided for a cage trap having an animal enclosure, preferably a cage trap as disclosed in U.S. Publ. No. US2008/0115405. The mechanism is mounted outside the enclosure of the trap and is preferably remotely activated by an IR or RF transmitter to open a door of the trap and release a trapped animal when the operator is at a safe distance away. The mechanism may also be manually set with a time delay and may be associated with either a main entry door to the trap or with a secondary escape door located at an opposite end of the trap.

14 Claims, 5 Drawing Sheets

(56) References Cited

U.S. PATENT DOCUMENTS

| | | | | |
|---|---|---|---|---|
| 4,080,749 A * | 3/1978 | Gilbaugh | | 43/61 |
| 4,860,813 A * | 8/1989 | Ballyns et al. | | 296/50 |
| 4,890,415 A * | 1/1990 | Fressola et al. | | 43/61 |
| 4,912,872 A * | 4/1990 | Wynn et al. | | 43/61 |
| 4,953,500 A * | 9/1990 | Savage-Rumbaugh et al. | | 119/481 |
| 4,965,959 A * | 10/1990 | Gagne | | 43/61 |
| 5,212,903 A * | 5/1993 | Talbott | | 47/17 |
| 5,261,260 A * | 11/1993 | Lin | | 70/280 |
| 5,365,990 A * | 11/1994 | Ueda | | 160/23.1 |
| 5,544,690 A * | 8/1996 | Magro et al. | | 160/133 |
| 5,573,091 A * | 11/1996 | Hung | | 192/12 R |
| 5,768,828 A * | 6/1998 | Wilson | | 49/197 |
| 5,769,593 A * | 6/1998 | Buffaloe | | 414/537 |
| 5,774,066 A * | 6/1998 | Pellaton et al. | | 340/12.23 |
| 5,862,624 A * | 1/1999 | Askins | | 43/61 |
| 6,135,532 A * | 10/2000 | Martin | | 296/61 |
| 6,202,340 B1 * | 3/2001 | Nieves | | 43/61 |
| 6,276,744 B1 * | 8/2001 | Huber et al. | | 296/155 |
| 6,453,602 B1 * | 9/2002 | Russell et al. | | 43/100 |
| 6,708,443 B2 * | 3/2004 | Hall | | 43/107 |
| 6,710,714 B2 * | 3/2004 | Conway | | 340/573.3 |
| 6,990,767 B1 * | 1/2006 | Margalit | | 43/61 |
| 7,228,883 B1 * | 6/2007 | Murray | | 49/199 |
| 7,260,917 B2 * | 8/2007 | Brookbank et al. | | 49/197 |
| 7,370,451 B2 * | 5/2008 | Rich et al. | | 43/61 |
| 7,393,023 B1 * | 7/2008 | Kelly | | 292/144 |
| 7,419,204 B2 * | 9/2008 | Coble et al. | | 296/57.1 |
| 7,540,109 B2 * | 6/2009 | Hall | | 43/61 |
| 7,757,427 B2 * | 7/2010 | Bucher | | 43/61 |
| 7,854,088 B2 * | 12/2010 | Kurachi | | 43/61 |
| 7,958,668 B2 * | 6/2011 | Walter et al. | | 43/61 |
| 8,037,921 B2 * | 10/2011 | Dondlinger et al. | | 160/268.1 |
| 8,061,076 B2 * | 11/2011 | Kelley | | 43/61 |
| 8,104,221 B2 * | 1/2012 | Walter et al. | | 43/61 |
| 8,112,934 B2 * | 2/2012 | Alter et al. | | 43/61 |
| 8,171,667 B2 * | 5/2012 | Facklam | | 43/61 |
| 8,359,783 B1 * | 1/2013 | Kamery et al. | | 43/61 |
| 2003/0154656 A1 * | 8/2003 | Fitzgibbon et al. | | 49/199 |
| 2004/0244292 A1 * | 12/2004 | Oberheide | | 49/332 |
| 2005/0097808 A1 * | 5/2005 | Vorhies et al. | | 43/61 |
| 2008/0115405 A1 * | 5/2008 | Bucher | | 43/61 |
| 2008/0127560 A1 * | 6/2008 | Harvey | | 49/199 |
| 2008/0282600 A1 * | 11/2008 | Rich et al. | | 43/61 |
| 2009/0193717 A1 * | 8/2009 | Ebbe et al. | | 49/324 |
| 2010/0237653 A1 * | 9/2010 | Rydberg | | 49/324 |
| 2011/0005122 A1 * | 1/2011 | Bucher | | 43/61 |
| 2011/0120029 A1 * | 5/2011 | Uschock | | 49/324 |
| 2011/0167709 A1 * | 7/2011 | Pinkston | | 43/61 |

OTHER PUBLICATIONS

Tim's Live Trap Release System, www.youtube.com/watch?v=e0H1B49J2TQ, Jul. 17, 2007.

Remote Control Live Animal Trap for Feral Cats etc . . . , www.youtube.com/watch?v=6ebJi7B2txk, Nov. 18, 2008.

Remote Control Trap, Tomahawk model #608, (Brochure).

\* cited by examiner

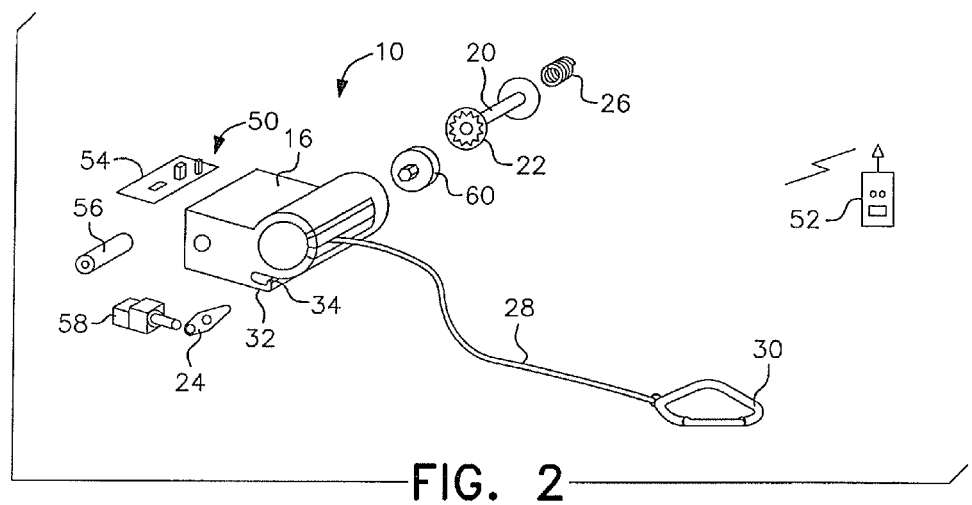
FIG. 2
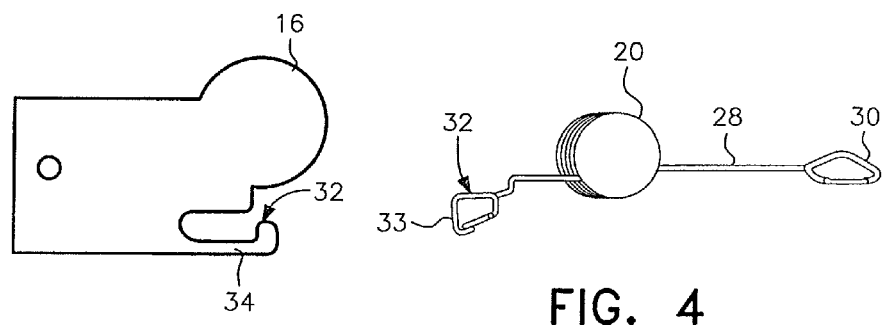
FIG. 3
FIG. 4

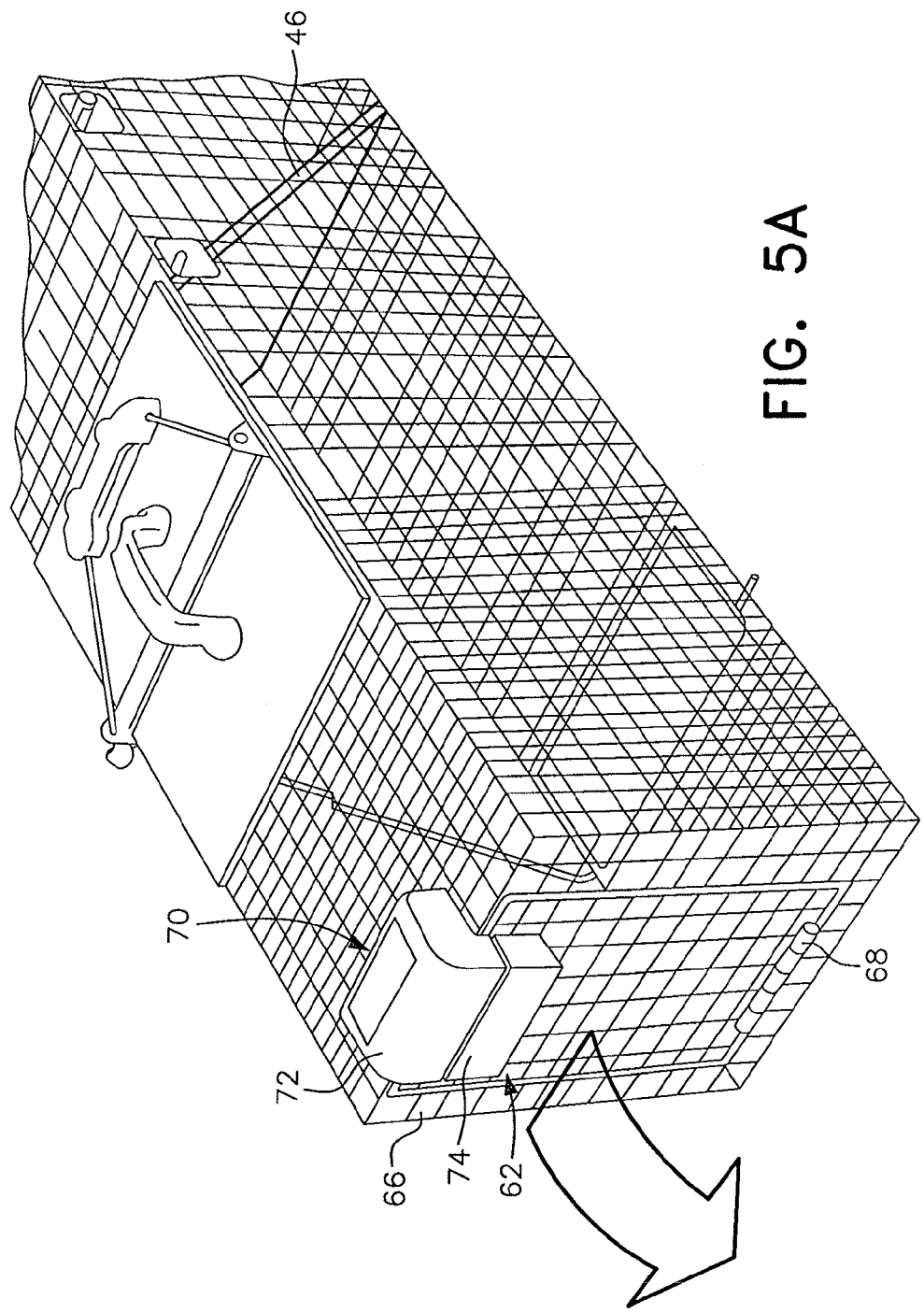

REMOTE-CONTROLLED CAGE TRAP DOOR-OPENING MECHANISM

This application is a continuation of application Ser. No. 12/585,803 filed on Sep. 24, 2009, now U.S. Pat. No. 8,359,783, which claims the priority of U.S. Provisional application Ser. No. 61/136,676, filed Sep. 24, 2008.

BACKGROUND OF THE INVENTION

1. Field of the Invention

This invention relates to cage-type animal traps of the kind generally used outdoors for trapping small to medium sized animals without harming the trapped animal.

2. Description of the Prior Art

Cage-type traps generally include a cage of metal wire mesh or the like with a door held open by a trigger mechanism until an animal is lured into the trap by suitable pre-inserted bait. After the animal enters the interior of the trap, the animal's weight pressed against the trigger actuates a trip which releases and closes the door, thereby trapping the animal inside the cage. A locking device serves to prevent the animal from opening the door from the inside.

To release the trapped animal, the locking device must be disengaged and the door must be opened. These steps generally require the use of two hands and involve close contact with the animal.

One solution to the problem of close contact with the trapped animal is set forth in copending application, U.S. Ser. No. 11/600,085, filed Nov. 16, 2006 ("the '085 application"), and published as U.S. Publ. No. US2008/0115405 on May 22, 2008, which is commonly owned by the assignee of the present application. The disclosure of the '085 application is hereby expressly incorporated by reference in its entirety as if fully set forth herein.

In the '085 application, the door at the front of a cage-type trap is held in the open position by an over-center set mechanism mounted on the roof of the trap. A cable assembly extends from the set mechanism to a point of connection on the door and a torsion spring, operatively connected to a locking yoke that engages the door, urges the door toward its closed position when the trap is triggered by an animal.

In addition to the cable assembly, the over-center set mechanism further includes a set mechanism platform attached to the roof with a transversely extending set lever bracket mounted thereon. A generally U-shaped set lever is pivotally coupled to both ends of the bracket so as to be movable through slightly less than 180 degrees from one side of the bracket nearest the rear of the trap in the set position to the other side of the bracket nearest the front of the trap in the tripped position. Generally centered on the set lever is a lever grip that can be grasped by a user when setting the trap to facilitate placement of the set lever in the set position.

The over-center set mechanism disclosed in the '085 application can be set using only one hand. Accordingly, opening the door of the trap to release a trapped animal requires only one hand, allowing the user to maintain a greater distance from the front of the trap than is possible with traps requiring two hands to place the trap door in the open position. Nonetheless, the user must grasp the lever grip and move it manually, necessitating that the user be immediately adjacent the trapped animal. When releasing a potentially dangerous animal, this may subject the user to an unacceptably close encounter when the animal exits the trap.

Similar concerns arise as well with other trap designs which require that the user physically open the trap to release the animal.

There is thus a need for a mechanism by which an over-center type cage trap such as that disclosed in the '085 application, or other style traps, may be remotely activated to open an escape door from a distance so that the user can easily release a trapped animal without subjecting the user to close contact with the trapped animal.

SUMMARY OF THE INVENTION

The present invention is therefore directed to a remotely activated cage door opening device for use with a cage-type animal trap that has a wire mesh animal enclosure made up of a base, a pair of opposed sidewalls emanating from the base, a rear wall secured to the sidewalls and the base, a roof secured to the tops of the sidewalls and the rear wall, and a front end provided with an animal access opening defined by the base, sidewalls, and roof.

According to a first embodiment, a single door is movably mounted at the front end and operates in an opened position to reveal the animal access opening and in a closed position to block the animal access opening. The door is held in its open position by an over-center set mechanism as disclosed in the '085 application which has a set handle mounted on the roof and a cable assembly that extends from the set handle to a point of connection on the door.

The remotely activated cage door opening device includes an infrared (IR) receiver and associated circuitry, a rotatable spool and cable, and a latch pawl at least partly enclosed within a housing. One end of the spool has a toothed sprocket that ratchets against the latch pawl and the other end of the spool engages a torsion/clock spring in the housing. The cable is wound on the spool with at least one free end thereof coupled to a fastening element that is secured to the set handle of the trap. The door opening device also includes an attachment element to secure the housing to the trap enclosure.

When the device is secured to the trap by the attachment element and the trap has been tripped so as to trap an animal inside, the cable is pulled off the spool against the tension of the torsion/clock spring until the fastening element can be clipped onto the set handle. The ratcheting of the sprocket against the pawl allows the extracted cable to remain extended without a retraction force.

The IR receiver includes a solenoid which is operative to release the latch pawl from the sprocket when actuated by a remote wireless IR transmitter. Once released, the cable is retracted onto the spool by the stored energy in the wound tension spring, automatically opening the door to which the cable is attached.

According to a second embodiment, the entry door is as already described in connection with the door of the first embodiment but, in addition thereto, a secondary escape door is provided at another location in the trap body, preferably at the rear end of the trap opposite the entry door at the front end. The secondary escape door operates independently from the entry door and is movable between closed and opened positions to either cover or uncover an escape opening formed in the side or end wall of the trap. A door release unit secures the secondary escape door in the closed position until activated, either by remote control or other release mechanism. Once activated, the escape door is free to move to the opened position at which time an animal inside the trap can escape through the escape opening while the entry door remains closed.

It is thus an object of the present invention to provide a remotely activated door-opening mechanism for a cage trap demonstrating mechanical and electronic simplicity for ease of opening the trap's door without requiring the user to have physical contact with the trap.

It is a further object of the present invention to provide a door-opening mechanism for a cage trap that is remotely controlled by a wireless IR transmitter to allow the user to maintain a safe distance from the trap when releasing a trapped animal.

It is another object of the present invention to provide a cage trap door-opening mechanism in accordance with the preceding objects and a first embodiment that can be retrofit onto existing cage traps equipped with an over-center set mechanism.

It is yet another object of the present invention to provide a door-opening mechanism for a cage trap in accordance with the preceding objects and the first embodiment that can be easily attached to and then removed from the cage trap as an accessory, allowing the same mechanism to be moved from one trap to another for opening the respective doors thereof.

It is still another object of the present invention to provide a door-opening mechanism for a cage trap in accordance with the preceding objects that is relatively simple in electronic design while providing robust mechanical operation to open the trap door.

It is a further object of the present invention to provide a cage trap in accordance with a second embodiment having a main entry door through which an animal enters the trap and a secondary escape door that operates independently of the entry door such that, once the animal has been trapped inside the cage, the user can remotely release the animal by triggering the opening of the secondary escape door while the entry door remains closed.

It is yet another object of the present invention to provide a cage trap in accordance with the preceding object in which opening of the secondary escape door is controlled by a door release unit that can be activated either using a remote control unit or with a mechanical time release.

Additional objects of the invention include, for example, the provision of a door-opening mechanism for a cage trap which is durable, reliable and user friendly, and which can be manufactured from readily available components and in a cost-effective manner.

BRIEF DESCRIPTION OF THE DRAWINGS

Other objects, features and advantages of the present invention will be apparent to those skilled in the art upon a reading of this specification including the accompanying drawings. While intending to illustrate the invention, the drawings are not necessarily to scale.

FIG. 2 is an exploded perspective view of the components of the door-opening mechanism shown in FIG. 1.

FIG. 3 shows a left side view of the front end of the housing to illustrate the sliding clip for securing the housing of the door-opening mechanism to the trap roof at the rear of the trap enclosure as shown in FIG. 1.

FIG. 4 shows an alternative embodiment to the clamp of FIG. 3, in which the door-opening mechanism includes clips on both ends of the cable, one clip for securing the mechanism to the trap enclosure and the other clip for securing the cable to the door.

FIG. 5A shows a cage trap having a secondary escape door in accordance with a further embodiment of the door release mechanism of the present invention, the secondary escape door being shown in a closed position.

DETAILED DESCRIPTION OF THE PREFERRED EMBODIMENTS

Figure 1:
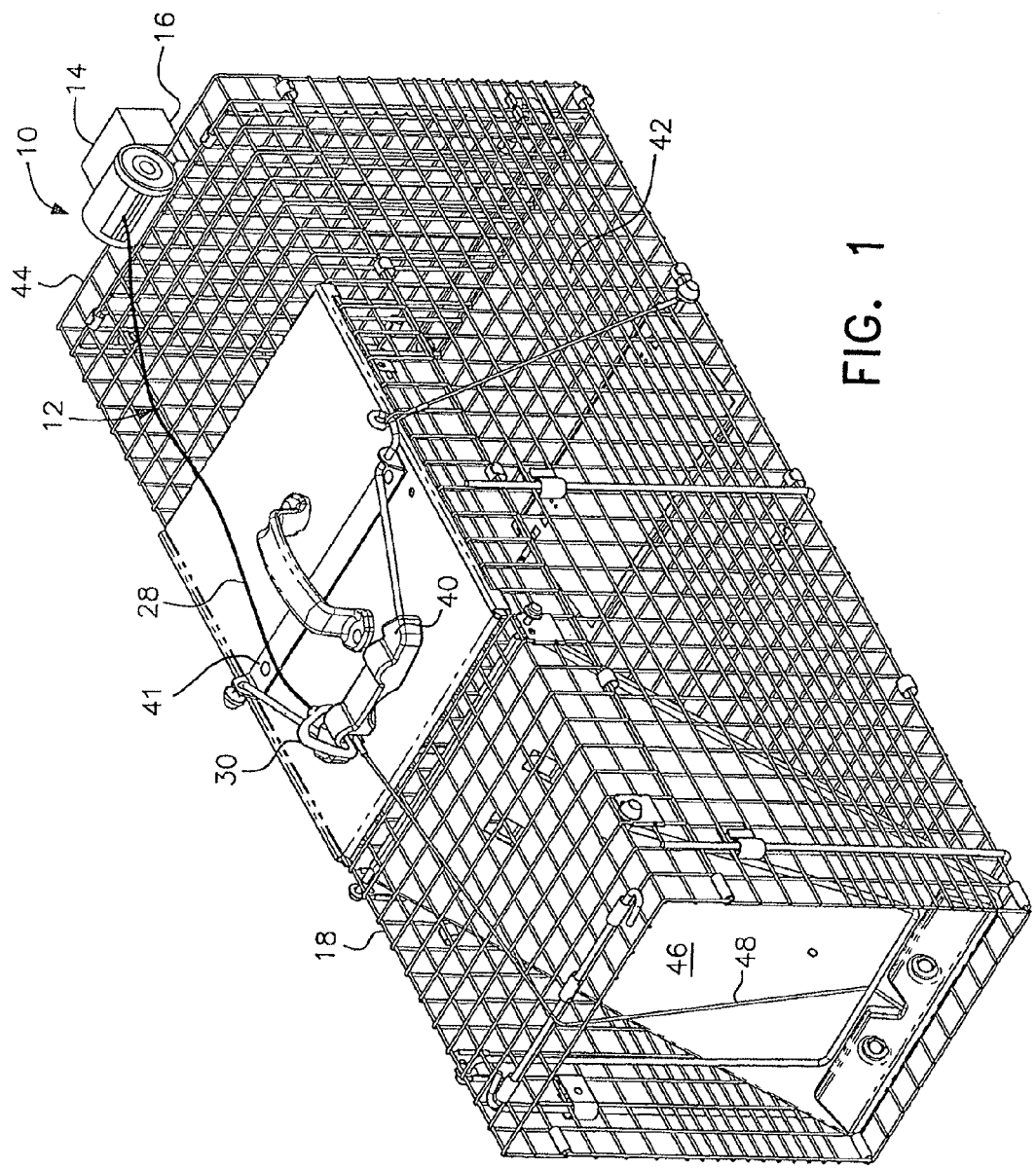
FIG. 1 is a perspective view of a preferred embodiment of the present inventive door-opening mechanism as mounted on a cage trap in a tripped position with the door of the trap closed.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

As shown in FIGS. 1 and 2, the remotely activated cage trap door-opening mechanism according to a first embodiment of the present invention is generally designated by reference numeral 10 and is mounted at the top rear of a cage trap as disclosed in the aforesaid '085 application. The door opening mechanism 10 includes a mechanical assembly, generally designated by reference numeral 12, and an activating assembly, generally designated by reference numeral 14. The activating assembly and portions of the mechanical assembly are contained within a housing 16 which is mounted to the trap 18.

The mechanical assembly 12 includes a rotatable spool 20, a toothed sprocket 22, a latch pawl 24, a torsion/clock spring 26 and a cable 28 with a fastening element 30. The toothed sprocket 22 is mounted on one end of the spool 20 so as to ratchet against the latch pawl 24 within the housing. The torsion/clock spring 26 is mounted on the opposite end of the spool 20. The cable is wound on the spool 20 with the extendible end thereof coupled to the fastening element 30. The fastening element 30 may be embodied as a clip, such as a carbineer style clamp, by which the extendible end of the cable 28 is secured to the set lever 40 of the trap 18.

The mechanical assembly 12 also includes an attachment element 32 to secure the housing 16 to the trap 18. This attachment element 32 may be embodied as a sliding clip element 34 (see FIG. 3), as a carbineer style clamp 33 (see FIG. 4), or as any other suitable clamp or fastening mechanism as would be understood by persons of ordinary skill in the art.

According to one preferred embodiment, the activating assembly 14 includes an IR receiver generally designated by reference numeral 50 and a remote IR transmitter 52. The receiver 50 includes a circuit board 54, a power source such as a battery 56, and a solenoid 58 operative to release the latch pawl 24 from the sprocket 22 when actuated by the remote IR transmitter 52. Alternatively, the receiver may be configured for RF communication with a remote RF transmitter.

To use the door-opening mechanism, the housing 16 is secured to the upper rear edge 44 of the trap enclosure 42 by the attachment element 32. The housing 16 may be secured to the trap prior to use, i.e., prior to setting the trap, or may be attached to the trap after an animal has been trapped. If the housing 16 is secured to the trap prior to use, according to a preferred method of use, the extendible end of the cable 28 is not attached to the set lever 40 of the trap 18 until after the trap has been tripped and the animal is to be released.

The trap 18 is set by moving the set lever 40 toward the rear of the trap 18 in the manner described in the '085 application. As shown in FIG. 1, the set lever is supported on a set lever bracket 41 that is mounted on the roof transverse to a longitudinal direction of the animal enclosure. As supported on the bracket 41, the set lever is pivotally movable in the longitudinal direction from one side of the bracket to the other side of the bracket. Therefore, when the trap 18 is tripped by an animal, the set lever 40 moves toward the front of the trap, i.e., from the side of the bracket 41 nearest the rear of the trap to the side of the bracket nearest the front of the trap, under the urging of the weight of the door 46 as conveyed through the trap cable assembly 48. Once the door is closed, the animal is trapped inside.

To release the animal, the housing is secured to the upper rear edge 44 of the trap enclosure 42, if not already secured thereto. The free end of the cable 28 is pulled out of the housing to extract the cable 28 from the spool 20 against the tension of the torsion/clock spring 26 until the fastening element 30 is positioned to be clipped onto the set lever 40. The ratcheting of the sprocket 22 against the pawl 24 allows the extracted cable 28 to remain extended without a retraction force.

With the end of the cable 28 attached to the set lever, the user may withdraw a desired distance away from the trap. Once the user is at a safe distance, the user or another individual having the remotely located IR transmitter 52, actuates the IR receiver 50. Actuation of the IR receiver 50 activates the solenoid 58 which, in turn, releases the latch pawl 24 from the sprocket 22. Once the pawl 24 is released, the spool 20 is free to spin and thereby retract the cable 28 onto the spool 20 by the stored energy in the wound tension spring 26. The retraction of the cable 28 pulls the set lever 40 toward the rear of the trap to automatically open the door 46.

To soften any abruptness in the rapid cable retraction, a rotary dampener 60 may be added to the mechanical assembly in a manner known to those skilled in the art.

As described herein, the cage trap door-opening mechanism is an independent accessory that can be easily attached to and then removed from any existing cage trap equipped with an over-center set mechanism to remotely open the door thereof.

Other mechanical assemblies suitable for the operation of the present invention could also be used as would be understood by persons of ordinary skill in the art. For example, the cable spool and cable could be operated by an electric motor or a hand-wound crank. Retraction of the cable could also be effected by a pneumatic cylinder.

Similarly, as alternatives to the IR transmitter and receiver, or to an RF transmitter and receiver, other remote means of conveying a signal and of receiving the signal by a receiver or comparable device on the activating assembly are also intended to be included within the present invention. The door-opening mechanism could also be mechanical or electrically timed. Activation of the door-opening mechanism could also be accomplished through the use of a wired remote or by a remote mechanical mechanism.

Figure 5B:
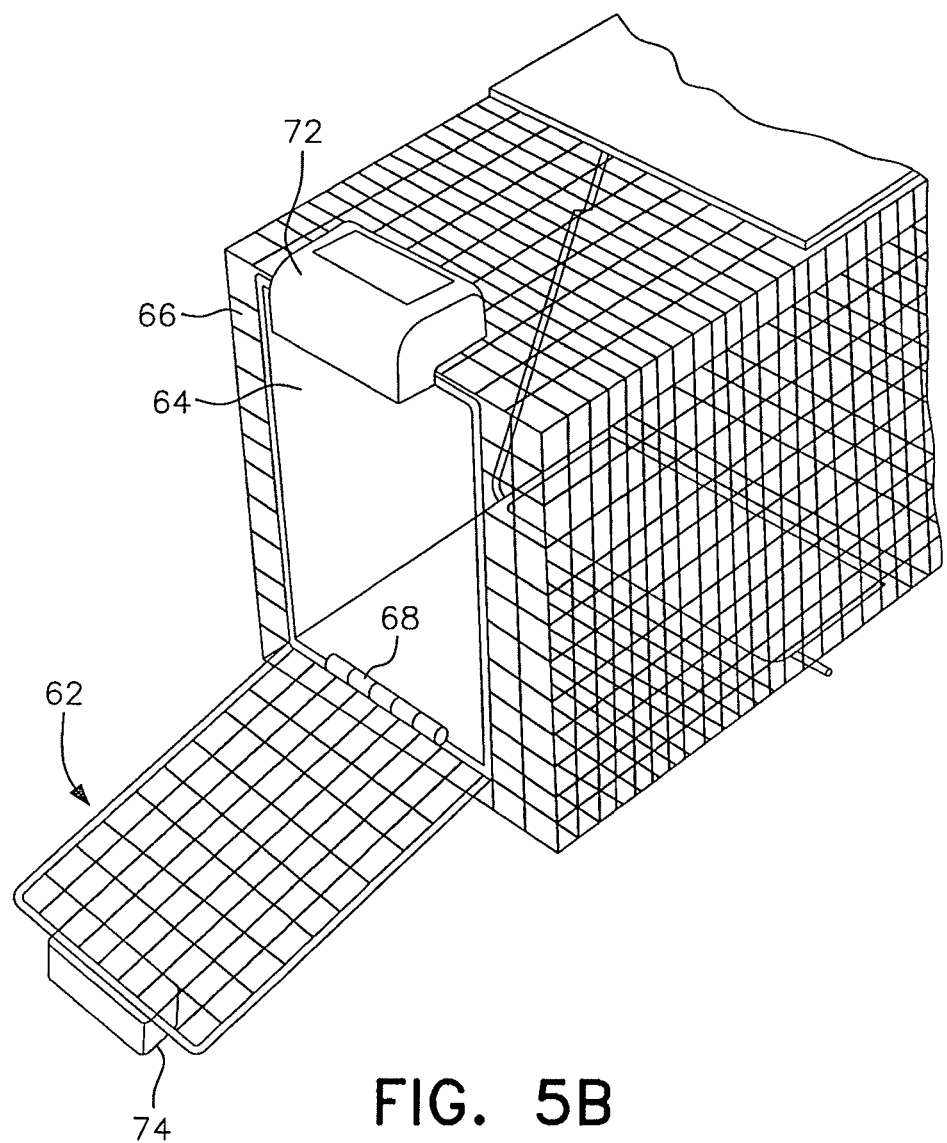
FIG. 5B shows a partial view of the cage trap of FIG. 5A with the secondary escape door being shown in an opened position.

Any of the above-described assemblies for operation and activation of a remote door-opening mechanism may also be used in conjunction with a trap having a separate escape door such as that illustrated in FIGS. 5A and 5B and generally designated by reference numeral 62, in accordance with a second embodiment of the present invention. The separate escape door 62 is preferably positioned at the opposite end of the trap relative to the entry door 46. Since the entry door 46 of the trap shown in FIG. 1 is described herein as being at the trap front end, then the separate escape door 62 is preferably at the rear end of the trap. Alternatively, the separate escape door could be positioned on the side of the trap, preferably near the rear end. Wherever its location, the separate escape door 62 may be more simply designed than the entry door, requiring only a movable panel that can be positioned and held in a closed position, as shown in FIG. 5A, to cover an escape opening 64, and then moved to an opened position to uncover the escape opening, as shown in FIG. 5B.

In the embodiment shown in FIGS. 5A and 5B, the escape door 62 is pivotally mounted to the end wall 66 of the trap by a hinge 68 positioned at the bottom of the escape opening 64. When the trap is in a set condition for trapping an animal as shown in FIG. 5A, the escape door 62 is held vertically in a closed or secured position by a door release unit generally designated by reference numeral 70.

The door release unit 70, in the embodiment shown, includes a control assembly 72 mounted on the trap body, preferably on the roof 76, and a catch 74 mounted on the escape door 62 so as to be adjacent the control assembly 72 when the escape door is in the closed position. Alternatively, the control assembly 72 may be mounted adjacent one side of the escape door with the catch then being placed on the escape door in generally horizontal alignment with the control assembly. With this alternative placement of the release unit, the escape door may be secured to the trap by a vertical hinge (not shown) positioned on the opposite side of the door so that the escape door is configured to swing between opened and closed positions while remaining in a vertical orientation.

The control assembly 72 includes a latching mechanism (not shown) for securing the catch 74 to keep the escape door in the closed or secured position until the control assembly 72 is activated. The latching mechanism can use mechanical, electrical, magnetic, or other means to keep the catch 74 engaged with the control assembly. When this engagement is released by the control assembly, the door and catch are allowed to pivot downwardly away from the control assembly to uncover the escape opening 64.

Figure 5C:
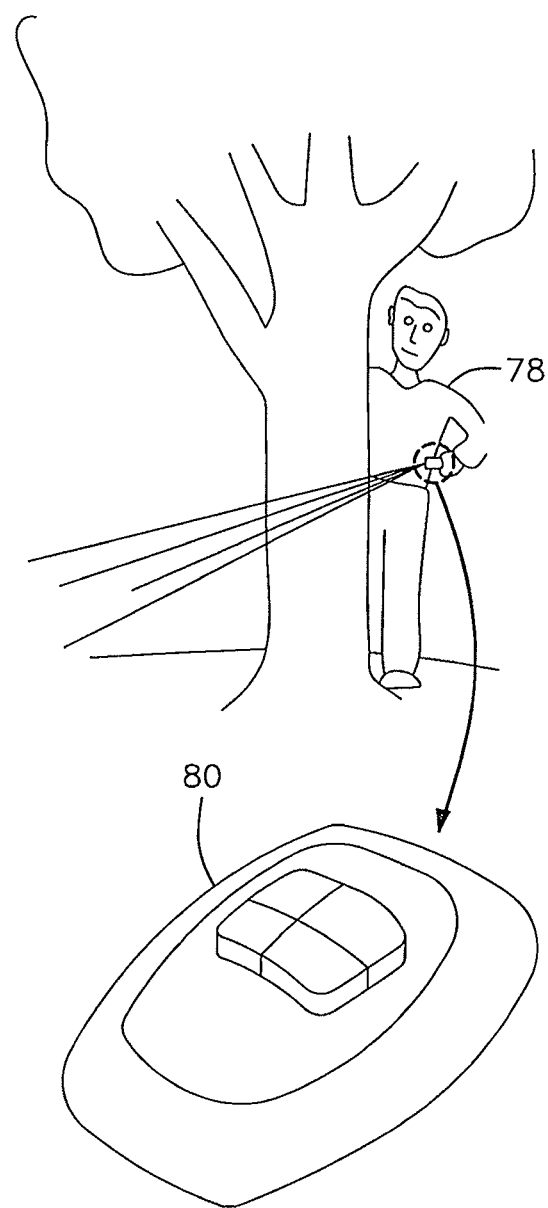
FIG. 5C shows a user activating the trap of FIGS. 5A and 5B from a safe distance using a remote control unit.

According to one preferred embodiment, the door release unit 70 is battery powered and remotely activated by a user 78 using a remote control unit 80 as shown in FIG. 5C. Alternatively, the door release unit 70 can be designed to operate using a mechanical time release, such as that described in U.S. Pat. No. 3,638,346, by which a manually set timing device triggers the opening of the escape door after the manually set time period has elapsed. In conjunction with such a mechanical time release, the escape door may be spring loaded so as to be ready to swing open when the door release unit is triggered by the timer.

However configured, the present invention provides a door-opening mechanism that is easy to use and which, through the remote control activation capability, allows the user to maintain a safe distance from the trap when releasing a trapped animal.

It is to be understood that the present invention is not limited to the illustrated embodiments described herein. Modifications and variations of the above described embodiments of the present invention are possible as appreciated by those skilled in the art in light of the above teachings.

What is claimed is:

1. An animal trap comprising:
   an animal enclosure having a roof and a front end with an animal access openina into an interior sized to receive an animal to be trapped;
   an entry door movably mounted at the access opening, the door operative in an opened position to reveal the animal access opening and in a closed position to block the animal access opening;
   an actuating mechanism operative with said door and including a set lever pivotally movable from a first position adjacent the entry door, wherein in said first position the door is in the closed position, to a second position adjacent a rear end of the enclosure, wherein in said second position the door is in the opened position;

a trip mechanism for actuating a pivot action of the set lever to cause the set lever to move from the second position to the first position, closing the door to trap the animal in the animal enclosure;

a remote control unit capable of communicating with said trap at a distance away from said trap by transmitting wireless signals;

a receiver associated with the trap and configured to receive said wireless signals from said remote control unit; and a door-opening mechanism mounted to said trap outside said animal enclosure and remotely activated when said receiver receives a wireless signal from the remote control unit to pivot the set lever from the first position to the second position to remotely open the door and release the animal.

2. The animal trap of claim 1, wherein said actuating mechanism includes:

an actuating cable secured at a first end to said door and at a second end thereof to said set lever; and a set lever bracket mounted on the roof transverse to a longitudinal direction of the animal enclosure, said set lever being supported on said bracket so as to be pivotally movable in said longitudinal direction from one side of said bracket to the other side of said bracket.

3. The animal trap of claim 2, wherein said door opening mechanism includes a spring-loaded retractable mechanism coupled at a free end to the set lever and secured at an opposite end within a housing mounted on the trap, said retractable mechanism retracting into said housing to pull said set lever to the second position in response to receipt of at least one of said wireless signals by said receiver.

4. The animal trap of claim 3, wherein said receiver is an infrared receiver configured to receive infrared signals from an infrared transmitter at said remote control unit.

5. The animal trap of claim 3, wherein said receiver is an RF receiver configured to receive RF signals from an RF transmitter at said remote control unit.

6. The animal trap of claim 3, wherein said retractable mechanism includes a rotatable spool with a toothed sprocket and a cable, and said housing includes a latch pawl against which said toothed sprocket is ratcheted when said cable is extended.

7. The animal trap of claim 6, wherein said receiver includes a solenoid operative to release said latch pawl from the sprocket when actuated by a wireless signal received by the receiver.

8. The animal trap of claim 1, wherein said door opening mechanism is removably mounted to said trap.

9. The animal trap of claim 1, wherein said door-opening mechanism is battery powered.

10. The animal trap of claim 1, wherein said door opening mechanism is removably mounted to said trap.

11. An animal trap comprising:

an animal enclosure having a front end, a rear end, a floor, side walls and a roof with an animal access opening in said front end providing access to an animal into an interior sized to receive the animal to be trapped;

a door movably mounted at the access opening, the door operative in an opened position to reveal the animal access opening and in a closed position to block the animal access opening;

an actuating mechanism including a set lever operative to control movement of the door from said opened position to said closed position and to hold said door in said opened position once the trap is set;

a trip mechanism for tripping said actuating mechanism to enable said door to move to said closed position and trap an animal inside the enclosure;

a receiver configured to receive wireless communication signals from a remote control unit; and a door-opening mechanism associated with said door and including a housing with a control assembly mounted to the trap, said control assembly being activated in response to receipt, by said receiver, of a wireless communication signal from the remote control unit, said control assembly including a retractable mechanism having a rotatable spool with a toothed sprocket and an elongated member coupled at one end to said set lever and configured to be wound onto said spool, and said housing including a latch pawl against which said toothed sprocket is ratcheted when said elongated member is extended, said control assembly configured to retract said elongated member onto said rotatable spool in response to receipt of said wireless communication signal sent by a remotely located user using said remote control unit to send said wireless communication signal, retraction of said elongated member onto said spool and into said housing pulling the door to the opened position.

12. The animal trap of claim 11, wherein said receiver is an infrared receiver configured to receive wireless infrared communication signals from said remote control unit to initiate opening of said door.

13. The animal trap of claim 11, wherein said receiver is an RF receiver configured to receive wireless RF communication signals from said remote control unit to initiate opening of said door.

14. The animal trap of claim 11, wherein the elongated member is a cable.

* * * * *